RONALD L. RANDEL
INVENTOR.

BY

Ely Silverman
ATTORNEY

INVENTOR: *RONALD L. RANDEL*
BY *Ely Silverman*
ATTORNEY

June 7, 1966          R. L. RANDEL          3,255,445

ADVERTISING PROCESS AND APPARATUS THEREFOR

Filed June 11, 1965          5 Sheets-Sheet 3

INVENTOR: *RONALD L. RANDEL*

BY *Ely Silverman*

ATTORNEY

June 7, 1966  R. L. RANDEL  3,255,445
ADVERTISING PROCESS AND APPARATUS THEREFOR
Filed June 11, 1965  5 Sheets-Sheet 4
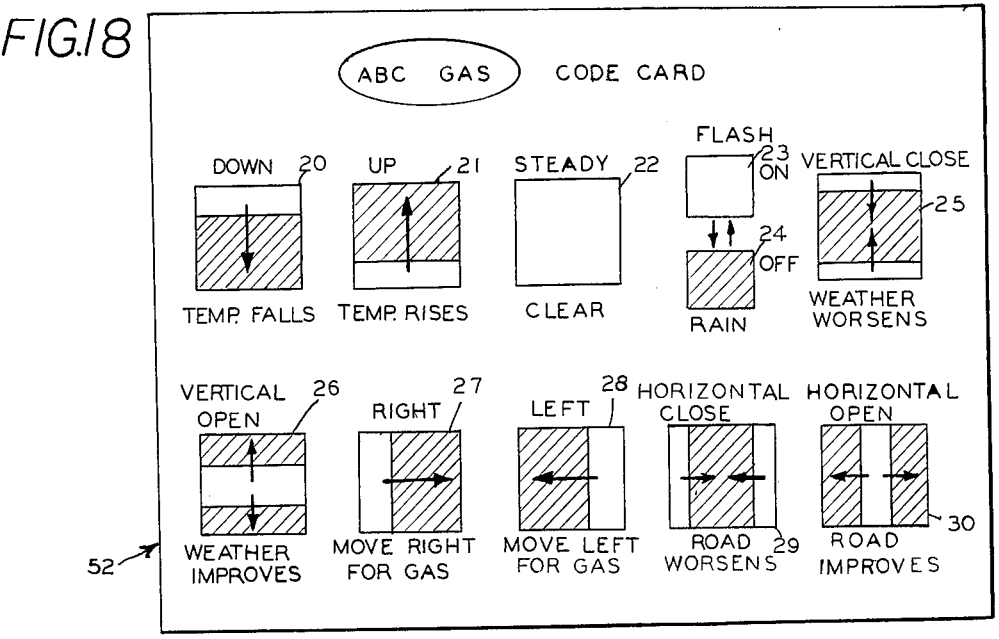
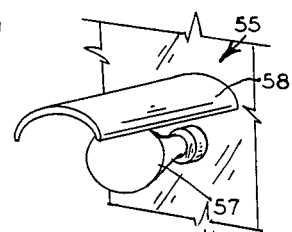
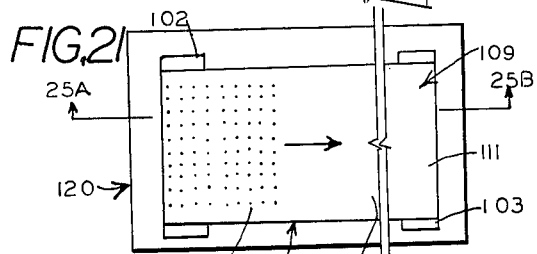
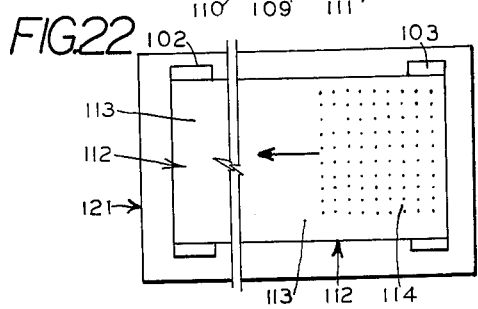
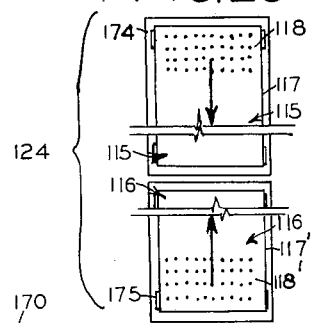
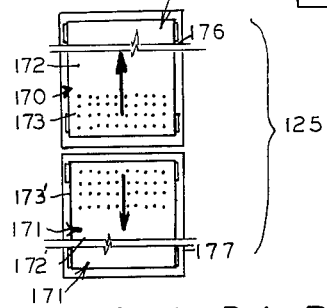
RONALD L. RANDEL
INVENTOR.
BY  Ely Silverman
ATTORNEY

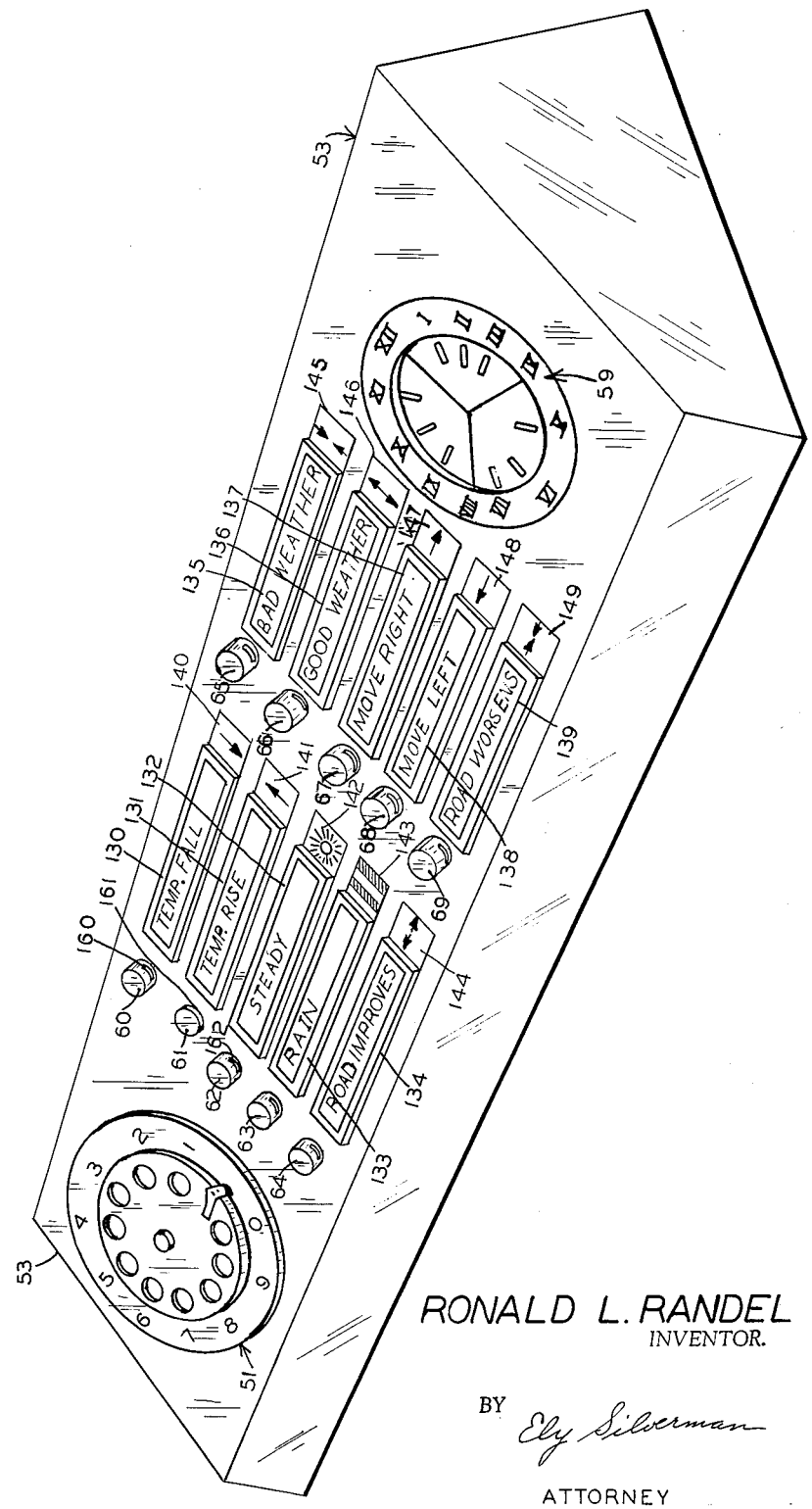

United States Patent Office 3,255,445
Patented June 7, 1966

3,255,445
ADVERTISING PROCESS AND APPARATUS
THEREFOR
Ronald L. Randel, Box 9084, Amarillo, Tex.
Filed June 11, 1965, Ser. No. 463,215
4 Claims. (Cl. 340—334)

This invention relates to sign systems for advertising purposes. More particularly, this invention relates to improved signs, method of transmission of information, and method of presentation of such information for advertising purposes.

Current advertising signs do not provide compensation for the present necessity of one-glance message perception and understanding, notwithstanding the already achieved growth of superhighways and roads and dense and rapid automobile traffic thereover, by viewers riding in an automobile, especially drivers.

One object of this invention is to provide an improved sign apparatus.

Another object of this invention is to provide an improved method and apparatus for transmission of information.

Yet another object of this invention is to provide an improved advertising method and apparatus.

Still a further object of this invention is to provide a sign having improved safety features for the observation thereof by the proposed viewer while driving an automobile.

Still a further object of this invention is to improve the safety of viewing of advertising signs.

Other objects of this invention will become apparent to those skilled in the art upon a study of the below specification, of which specification the drawings attached hereto form a part and wherein the same numbers refer to the same parts throughout, and wherein.

Figure 2:
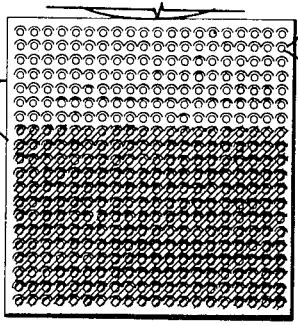
FIGURE 2 is an overall front view of a face of a sign, 37, according to this invention in an early phase of one sequence of its operation.

The views of FIGURES 3 through 17 are all taken in the same manner as in FIGURE 2.

Figure 25:
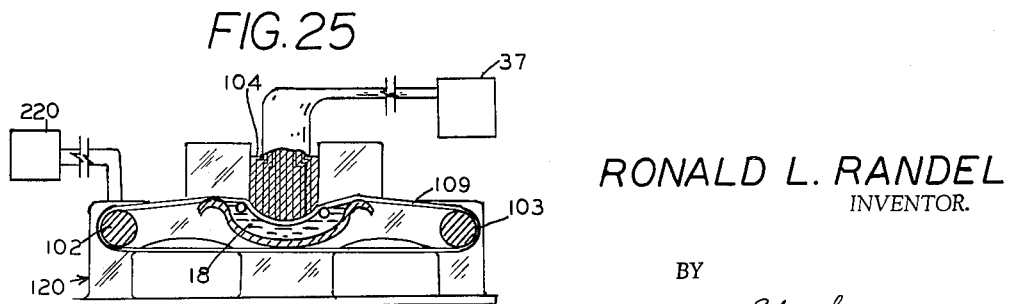
Figure 3:
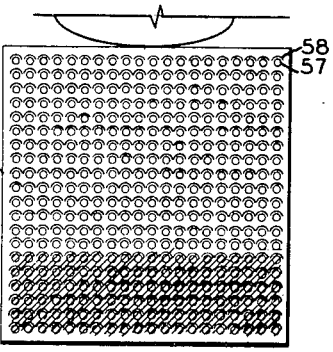
FIGURE 3 is a view of the face of the sign of FIGURE 2 in a subsequent phase of the sequence of operation shown in FIGURE 2.

FIGURE 25 is a diagrammatic cross sectional view as in FIGURE 3 of U.S. Patent 1,394,565 of a sign control unit 120 according to this invention, this cross sectional view is taken along a vertical plane corresponding to that shown by line 25A–25B of FIG. 21.

FIGURE 18 is a diagrammatic showing of a code card for use in the process of and with the apparatus of this invention;

FIGURE 19 is a perspective view of a lamp and shade therefor in a preferred embodiment of sign according to this invention;

FIGURE 20 is a perspective view of a dispatch switch box in accordance with the invention;

FIGURE 21 is a plan view of portions of the perforated pattern sheets for use in producing a signal as shown in symbols 20 and 28;

FIGURE 22 is a plan view of portions of the perforated pattern sheets for use in producing signals as shown in symbols 21 and 27;

FIGURE 23 is a plan view of portions of the pair of the perforated pattern sheets for use in producing signals as shown in symbols 25 and 29; and, FIGURE 24 is a plan view of portions of the pair of the perforated pattern sheets for use in producing signals as shown in symbols 26 and 30.

Broadly, this invention is directed to a process comprising the steps of sensing and transmitting information, as below described, and presenting that information in a sign or plurality of sign apparatuses used so as to provide maximum use of the total area of the sign: that information is provided to the viewer in a precoded form whereby to substantially instantly, i.e. within a fraction of a second, inform those who have knowledge of the code and see the signs, of the information to be transmitted by the sign.

Conventional signs may spell out to all the temperature or the time, or the letters of the words of a statement that the weather will subsequently be fair or rainy. The apparatus and process of this invention provides that the transmitted information will be available only to a select group (i.e. the group that has the code by which the signs are operated), and, further still, this information is transmitted to the viewer extremely rapidly by utilizing the entire area of the sign. The conventional sign utilizes only a limited amount of the area thereof for carrying the message, i.e. each of the letters are all substantially smaller than the entire height and width of the sign, and the viewer has to be sufficiently close to the sign to see and focus on and identify each of the components of the message thereof. The sign of this invention provides that, so long as the sign is visible, the message is visible.

Figure 6:
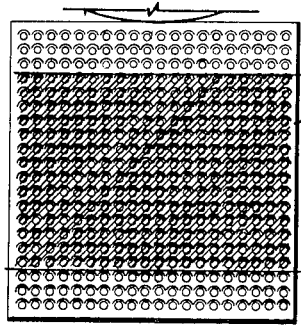
FIGURE 6 is a view of the sign of FIGURE 1 in an early phase of another sequence of operation according to this invention.

In some conventional signs (such as U.S. Patent 1,234,514 to Walden, issued July 24, 1917, FIGURE 6, and Wilde, U.S. Patent 1,784,861) only a portion of the sign is used, and the viewer has to be sufficiently close to the sign to see portions of the sign to distinguish the various letters of which the message is composed; in contrast thereto, the sign apparatuses of this invention provide that the entire area of the sign is used to instantly transmit the information provided by the sign to viewers thereof.

In some conventional signs (such as that in U.S. Patent 2,290,261) the entire area of the face of the sign is used to consecutively form a series of letters or number characters in a manner to spell out words and sentences which impart a desired message over a finite and substantial period of time extending over the period of time required to expose all of the letters required to spell out the message.

According to this invention, by full use of the display face of a sign, said face occupying a relatively small space, a signal carrying a message employing a relatively large number of words may be displayed; such signal notwithstanding the briefness of time required for its observation, will clearly impart the desired message to chosen observers at one brief sighting, lasting, in a preferred embodiment, no longer than one fifth of a second. This type of sign has particular utility in transmitting messages to people on streets and highways while they are driving automobiles. The apparatus is below described.

Figure 4:
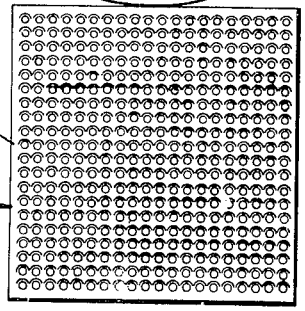
FIGURE 4 is a view of the face of sign 37 in its fully lighted phase common to several operations according to this invention.
Figure 8:
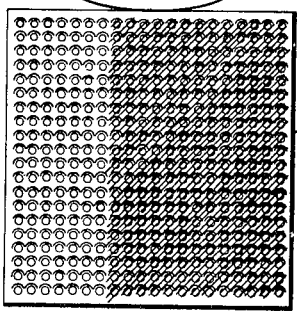
FIGURE 8 is a view of the face of the sign of FIGURE 2 in an early phase of yet another sequence of operation thereof.

By the process of this invention, according to this invention, which is described herein firstly in regard to a process and apparatus for advertising based on information as to weather, and secondly in regard to other information, an advertiser transmits to the people who are to receive his advertising information while such people are traveling rapidly on the road. For example, a receiver's code card as 52 shown in FIGURE 18 is provided by the advertiser, directly or indirectly, to the viewer. Such card 52, states and shows by the symbol 21, of an arrow pointing upwardly on the card that the simulated movement of lights upwardly would mean that the ambient or air temperature will be going up, and by the symbol 20, of an arrow pointing down, that the simulated movement of lights in a downward direction in the sign indicates that the temperature will be falling, i.e. the lights are successively lit in the downward sequence shown in FIGURES 5 to 2 to 3 to 4, to indicate that air temperature will be falling. A symbol as 21 and text on the card 52, indicate and state that the lights will be lit in the sequence of FIGURES 5, 10, FIGURE 11, and FIGURE 4, when the temperature would be rising. A sequence of all the lights simultaneously flashing all on and all off as in FIGURES 4 and 5 would be taught on card 52 as indicating that rain would occur and would be so shown by symbols as in 23 and 24 and text. A steady lighting of all the sign lights as shown in FIGURE 4 and symbol 22 would for example mean that the weather would be clear or would not change. The successive movement of light toward the middle from the bottom and top as shown in symbol 25, i.e. with the lights being lit successively from the top and bottom toward the center as in the sequence of FIGURE 5, FIGURE 6, FIGURE 7, and FIGURE 4, would indicate that the weather would be getting bad; conversely the symbol of lights moving from the center vertically outward, and as shown in FIGURES 5, 14, 15, and 4, would indicate that the weather would be getting better or clearing and indicated by symbol 26 on the card 52.

Movement to the right as shown by symbol 27 is shown by the sequence of FIGURE 5, FIGURE 8, FIGURE 9, FIGURE 4, and movement to the left is shown by the sequence of FIGURE 5, FIGURE 12, FIGURE 13, and FIGURE 4 and symbol 28 to indicate that movement to right or left, respectively, is necessary.

A worsening or dangerous road condition is shown by symbol 29 and the sequence of lighting of lights of which the sequence of FIGURES 5, 16, 17, and 4 form a characteristic part. Accordingly, by this invention, the connections for each of the bulbs in the signs are such, as below described in detail, to provide for the entire use of the entire face of sign to provide, at one sighting, any of several complete messages to the observer.

A person with normal vision or "20/20 vision" sees letters 8 millimeters high at 20 feet. Accordingly, at a distance of 100 feet a person with normal vision should be able to read letters 40 millimeters high, i.e., slightly less than 2 inches high.

However, due to haze, time required to focus, and hazards in a driver taking his eyes from the road on which he is driving, the letters on the conventional "stop" sign are 8 inches high (about 204 mm.) and 4 inches wide. Normally these signs are not intended for observation at more than 200 feet, although their message is short and such signs are located closer to the street than are advertising signs and such signs have a characteristic outer shape.

The signs of the invention provide readily visible and understood patterns of motion, which patterns of motion make substantially complete use of the sign race.

According to this invention, a normal viewer may not only once see and understand the entire sign at a distance of over a mile, but may also comfortably and safely understand several repetitions of any of the several entire messages thereof even though the viewer be traveling at a substantial rate of speed, such as 60 or 70 miles an hour, relative to the sign. Even then the viewer is able after first seeing the sign to safely glance at least two or three times, each time for a ½ of a second, at the sign. At each view of the sign the viewer may not only completely understand the message thereof but is exposed to the advertiser's trademark or message on the sign. Also, the message and advertisement on the card 52, is exposed to the viewer at each time the viewer refers from the sign to the card, or vice versa.

Each sign, as 37, consists essentially of a face portion 55 and a smaller advertising portion 56. The advertising portion is firmly affixed to the sign portion. In the preferred embodiment it is located adjacent to yet outside of the area over which the pattern and sequences of lighting of lamps above described occur. Thereby the advertiser's mark does not interfere with the message of the face portion 55 yet is viewed simultaneously with the patterns and sequences on the portion 55.

In the preferred embodiment each lamp as 57 on the face 55 is provided with a hood 58 thereover to shade the lamp and improve the contrast between the lighted and unlighted lamp. The hood extends forward of the sign face 150% of the greatest length of forward extension of the lamp therebelow.

According to one embodiment of system of this invention, a weather report for an area or Zone A is sensed at a conventional U.S. weather sensing station as 31. The report of this sensing is made by the operator 32 and is received by a second operator 33. The operator 33 puts the information reported via dispatch switch box 53 into transmitter 35 according to the code provided by the card as 52 which is provided to selected viewers, as 42. According to a particular code as given on card 52 if the temperature is rising the circuit actuated by switch button 61 is actuated by operator 33; if the temperature is falling the circuit actuated by switch button 60 is actuated by the operator 33; if the temperature is to remain steady the circuit actuated by switch button 62 is actuated by operator 33; the switch button 63 provides for actuating the circuit by operator 33 for providing the rain signal of symbols 23 and 24 and above discussed; a switch button 65 provides for the signal referred to by symbol 25; buttons 66, 67, 68, 69, 64 provide, respectively, for the signals indicated by symbols 26, 27, 28, 29, and 30 above discussed, which signals are described and explained on the code card 52.

The signal dispatched at dispatch box 53 connects by wire to the master units as 77, 78, and 79 for signs 37, 38, and 39, respectively.

The transmitter 35 is connected to a plurality of like master units as 77, 78, and 79 for and adjacent to and supported on the rear of each of the signs as 37, 38, and 39 respectively.

Each master unit as 77 is operatively connected to a conventional 110 or 220 volt A.C. electric power source 76 (86 for unit 78, 96 for unit 79) and comprises a sign pattern relay control subassembly (75 in unit 77), operatively connected to a sign lighting pattern control unit subassembly (74 in unit 77); the latter subassembly connected to its sign, as 37.

Figure 7:
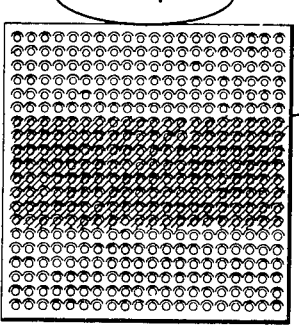
FIGURE 7 is a view of the sign of FIGURE 2 in a subsequent phase in the sequence of operation shown in FIGURE 6.

The pattern control subassembly 74 comprises a plurality of like pattern control devices 120–122 and 124–129, each generally as in FIGS. 1–6 of U.S. Patent 1,394,565, and each with a pattern sheet generally as shown in FIGURE 7 of U.S. Patent 1,394,565 but modified as shown in FIGS. 21–24 herein and below discussed. Each device as 120–122 and 124–129 provides one of the patterns of lights on each sign, as 37, indicated by one of the symbols 20–22 and 25–30 respectively. A flasher as in U.S. Patent 2,000,700 may be used in lieu of the apparatus of Patent 1,394,565 for unit 122 as well as for pattern control unit 123 to provide the flashing action corresponding to symbols 23 and 24 of card 52.

Subassembly 74 comprises a series of like relay units 220–229.

The box 53 is operatively connected to a power source 153. The source 153 is thus selectively connected, by any of the ten conventional selector switch means in box 53, each controlling a conventional switch button therefor, as 60 through 69, to any one of the similar relay units, as 220 through 229 respectively, of the relay subassembly 75 in unit 77 and, simultaneously, to corresponding relay units in master units as 78 and 79 of other signs, as 38 and 39. The power from source 76 is selectively connected by any one of relays 220 through 229 to any corresponding one of the devices 120 through 129 respectively in unit 77. The relay means 220–229 are conventional relay means as in U.S. Patent 2,290,261. The power from each of the sources as 86 and 96 for each master unit as 78 and 79 respectively is selectively connected by relays identical to 220 through 229 in units 78 and 79 respectively to units identical to units as 120 through 129 respectively in units 78 and 79. Thereby the actuation and sequence of patterns of lighting for all of the lamps on all of the signs connected to the box 53, as 37, 38, and 39 is simultaneously the same. The buttons 60–69 are each provided with a holding slot, as 160 in button 60, 161 in 61, 162 in 62, etc. whereby to hold any such switch button in place by gripping the frame of the box 53 once a button (e.g. 61) is pushed and so permit continued repeated patterns on each sign until such switch button is released and another sequence is applied to the circuits of the signs as 37, 38, and 39 by other buttons.

The transmission system from box 53 to units 77, 78, and 79 as above described is by direct wire and selector switch. In another particular embodiment according to this invention, however, the master units as 77 may each be actuated by conventional telephone dial as 51 and conventional circuit actuation thereof whereby to actuate the relay switches as 220–229 for each of the units as 120–129 in each of the master units through conventional telephone circuits or by wireless. In such a preferred embodiment selection of a function is by a single pair D.C. loop furnished by the telephone company. Several functions are provided corresponding to symbols as 20, 21, 22 and 23. A conventional selector and decoder in the master unit (SECODE RPD673–5F selector and decoder) verifies the function transmitted and a corresponding selector and decoder unit is used at each of the master stations as 77, 78, and 79.

In a particular preferred embodiment of the invention each sign as 37 has overall height of 10 feet and a width of 10 feet and is a distance about 20 feet from the side of the road 46 with its bottom edge as 45 about 10 feet above the ground.

The sign 37 includes a light board or face portion 55, lamps supported on the lightboard or face portion, an electric circuit embracing the lamps arranged on the light board and several sets of conductors, each set in connection with each of the lamps.

Figure 5:
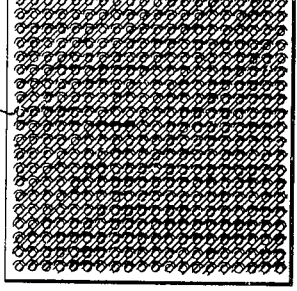
FIGURE 5 is a view of a face of the sign of FIGURE 4 in its fully darkened phase common to several operations of this invention.
Figure 9:
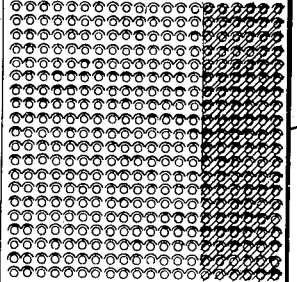
FIGURE 9 is a view in a subsequent phase in the sequence of operation shown in FIGURE 8 of the face of the sign of FIGURE 2.
Figure 10:
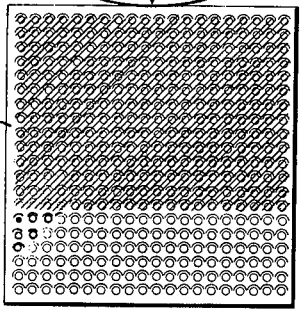
FIGURE 10 is an overall front view of the face of sign 37 according to this invention in an early phase of another sequence of its operation.
Figure 11:
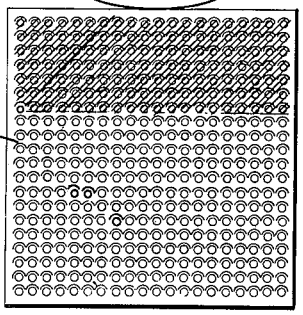
FIGURE 11 is a view of the face of the sign of FIGURE 10 in a subsequent phase of the sequence of operation shown in FIGURE 10.
Figure 12:
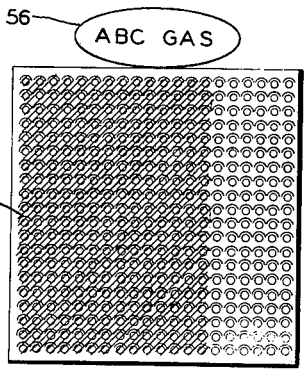
FIGURE 12 is a view of the face of the sign of FIGURE 2 in an early phase of another sequence of operation according to this invention.
Figure 13:
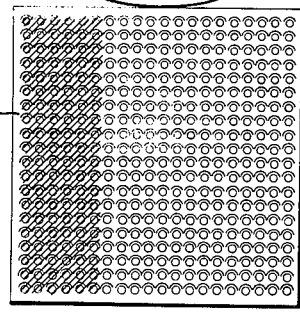
FIGURE 13 is a view of a face of the sign of FIGURE 12 in a subsequent phase in the sequence of its operation shown in FIGURE 12.
Figure 14:
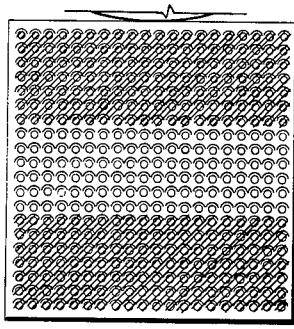
FIGURE 14 is a view of the sign of FIGURE 2 in an early phase of another sequence of operation of the invention.
Figure 15:
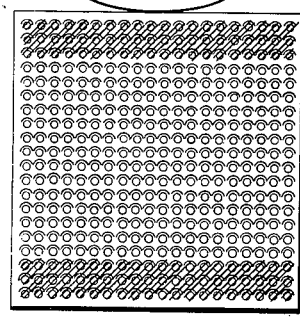
FIGURE 15 is a view of the sign of FIGURE 2 in a subsequent phase in the sequence of operation shown in FIGURE 14.
Figure 16:
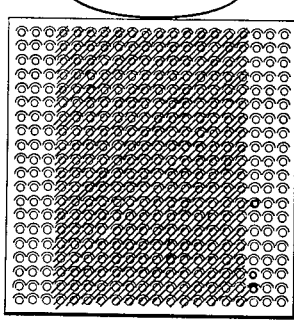
FIGURE 16 is a view of a face of the sign of FIGURE 2 in an early phase of yet another sequence of operation thereof.
Figure 17:
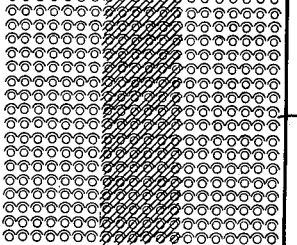
FIGURE 17 is a view in a subsequent phase in the sequence of operation shown in FIGURE 16.

The lamps as 57 are arranged on the face portion 55 in transversely equispaced longitudinally extending rows or lines with the lamps equispaced longitudinally along each such row or line and forming longitudinal equispaced transversely extending rows or lines; these rows of lamps extend fully across the face of the signboard, as shown in FIGS. 2 through 17. The electrical circuit includes multiple means for controlling the illumination of each of said lamps in repeated patterns; said means includes alternatively operative lamp circuit controlling means as in U.S. Patent 1,394,565. Signs 37, 38, and 39 are identical. In the preferred embodiment, each sign, as 37 is composed of a plurality of like incandescent lamps each located along horizontal and vertical lines, such lines intersecting to form squares, each such square six inches along each edge. The lamps are all similar and are each of about 3″ outside diameter and are located at the corners of such squares. Such a sign subtends a visual angle of 5° at a distance of 7200 feet; this is quite sufficiently adequate for viewing with 20/20 vision from a mile away and, even when the viewer is traveling at 75 miles an hour, allows a full minute to be noticed and repeatedly fully and clearly viewed—together with the name of the advertiser. For a message composed of letters to be viewed similarly rapidly on such a sign would require that such letters be sufficiently small to put an entire word in such a size sign and would cut down the distance at which and the time for which the message of such a sign would be observable. Signs as 37, 38, and 39, however, provide not only for improved observability of the useful message of sign and for improved certitude and driver safety in its observation and understanding but also the view of the advertiser's name is also, with the message, repeated many times to the viewer during the period of the viewer's travel after his first notice of the sign until he passes the sign; e.g., the full message of the sign may readily be repeated 20 or 30 times in a minute and, therewith, the name of the advertiser; signs as 37 thus provide a substantial increase in the frequency or effectiveness of such signs as an advertising medium. In its operation the perforated sheet 109 of FIGURE 21 comprises an imperforate portion 110 and a perforated portion 111; one perforation is provided for each lamp in the board 55. The face of the sheet, i.e. the face above the rollers as 102 and 103 is, on operation, continuously and repeatedly moved horizontally to the right in the apparatus 120, an apparatus as in FIGURE 5 of U.S. Patent 1,394,565. In apparatus 120 the individual members of the row or line of conductors as 23 nearest the left roller 102 (19 as shown in FIG. 5 of the apparatus of U.S. Patent 1,394,565) are operatively connected to the individual members of the uppermost row or line of lamps on the face 55 and the individual members of the row of conductors nearest the right hand roller 103 are connected to the individual members of the lowermost row or line of lamps of face 55 of the sign 37. The other individual members of the rows of conductors are row by row successively connected to the individual members of the successive rows of lamps on the sign 37 between those uppermost and lowermost rows through the perforations. This connection of the sheets of FIGURE 21 and the lamps of sign 37 create, on all the other signs in the system, as signs 37 and 38 and 39 (at which signs as 38 and 39 the lamp and conductor and Patent 1,394,- 565 apparatus connections are the same as for sign 37), on actuation of the switch button 60 and relay 220 (for unit 77 and corresponding units as 78 and 79) the downward moving light pattern of symbol 20.

Another apparatus 127, similar to 120, is operated connected with the individual members of the row or line of conductors as 23 nearest the left roller 102 (as in FIG. 5 of the apparatus of U.S. Patent 1,394,565) connected to the individual lamp members of the row or line of lamps on sign 55 nearest to the right hand edge of sign face 55 and the conductors 23 nearest the right hand roller 103 are connected to the individual member of the line or row of lamps nearest the left hand edge of the face 55, the individual members of the rows of conductors therebetween row by row successively connected to the individual members of the successive rows of lamps between those members of the right and left edge rows of the face 55. A sheet identical to 109 is used therein and the face of the sheet, i.e. the face above the rollers 102, 103 is, on operation, continuously and repeatedly moved horizontally to the right as in the apparatus 120. On actuation of the circuit by closing button 68 of box 53 lines or rows of lamps on sign 37 are lit in repeated patterns of a rectangular sheet of light moving from right to left in the manner of symbol 28. Sign 38 and 39 simultaneously duplicate the pattern of sign 37.

In the operation of unit 121 the upper (over rollers 19) surface of its perforated sheet 112 (of FIG. 22) is repeatedly moved horizontally to the left in an apparatus as 120 and which apparatus 121 is connected to the lamps of face 55 as is apparatus 120; sheet 112 is a mirror image of sheet 109, on operation, unit 121 creates the upward moving light pattern of symbol 21. Another apparatus 127, similar in structure and operation to apparatus 128, is provided with a sheet as 112 with its top surface moving to the left as in apparatus 121 and similarly connected to the lamps of the signboard 55, actuation of the circuits therefor, as by button 67, causes the rows of lamps thereon to be successively lit from left to right in the manner of symbol 27.

As shown in FIG. 25, the above described pattern sheets, as 109, 112 (and 115 and 116 below described) of units as 120–121, 123–129 are each arranged in the form of continuous or endless belts that are, when the units as 120 are operated, continuously moved around and from one rotatable left roller as 102 to and around a rotatable right roller 103; these rollers are generally located as rollers 2 and 3 in FIGS. 1, 2, and 3 of U.S. Patent 1,394,565. This motion and the above and below described circuits for such apparatuses produces the repeated cycle of patterns characteristic of the signs of this invention. The upper layer or sheet of each belt as 109 (and 112, 115 and 116) enters in the apparatus of FIG. 25 the mercury 18 in a receptacle as 17 of U.S. Patent 1,394,565 and the tracker bar 104 of each unit as 120 operates in the same manner as bar 22 of the apparatus of that patent.

A pair of two similar apparatuses 174 and 175, similar to 120 and 121 respectively, form unit 124 as shown in FIG. 23.

Upper apparatus 174 is connected to the lamps of the top half of sign 37 as is unit 120. Lower apparatus 175 is connected to the lamps of the bottom half of sign 37 as is control unit 121.

Apparatus 174 includes a perforated sheet or belt 115 with its upper layer or surface in the location of the perforated sheet 1 of U.S. Patent 1,394,565 as is sheet 109 of unit 120; apparatus 175 includes a perforated sheet or belt 116 in the location of the perforated sheet 1 of U.S. Patent 1,374,562 as is sheet or belt 112 of unit 121.

Perforated sheets or belts 115 and 116 as shown in FIG. 23 each have an imperforate portion, as 117 and 117' and a perforated portion as 118 and 118' respectively. Each perforated portion is formed as is portion 110 of sheet 109. The conductors as 23 in the apparatus 174 in which sheet 115 is supported and moved are thus arranged to connect the leading edge of the downwardly (as shown in FIG. 23) moving perforations in the uppermost sheet or layer of belt 115 initially to operatively connect the uppermost lamps of the sign 37 to its power source 76, and additionally and successively, horizontal row by horizontal row, connect the lamps of the lower rows of the upper half of the sign to the power source therefor. Concurrently, the conductors in apparatus 175, in which sheet 116 is supported and moved are thus arranged to successively move the leading edge of the upwardly (as shown in FIG. 23) moving perforations (118') in the uppermost layer or sheet of belt 116 of the signboard 55 toward the leading edge of perforations in belt 115.

The conductors as 23 in the apparatus 175 in which sheet 116 is supported and moved are thus arranged to connect the leading edge of the upwardly (as shown in FIG. 23) moving perforations in the uppermost sheet or layer of belt 116 initially to operatively connect the lowermost lamps of the sign 37 to the power source 76, and additionally and successively, horizontal row by horizontal row, connect the lamps of the upper rows of the lower half of the sign to the power source therefor. Thereby the sequence of light pattern shown in symbol 25 is created.

A pair of two similar apparatuses 176 and 177 similar to 121 and 120 respectively form unit 125 as in FIG. 24.

Upper apparatus 176 is connected to the lamps of the top half of sign 37 as is unit 121. Lower apparatus 177 is connected to the lamps of the bottom half of sign 37 as is control unit 120.

Perforated sheets or belts 170 and 171 as shown in FIG. 24 each have an imperforate portion, as 172 and 172' and a perforated portion as 173 and 173' respectively. Each perforated portion is formed as is portion 110 of sheet 109. The conductors as 23 of U.S. Patent 1,394,565 in the apparatus 176 in which belt or sheet 170 is supported and moved are thus arranged to connect the leading edge of the upwardly (as shown in FIG. 24) moving perforations in the uppermost sheet or layer of belt 170 initially to operatively connect the lowermost lamps of the upper half of sign 37 to its power source 76, and additionally and successively, horizontal row by horizontal row, connect the lamps of the upper rows of the upper half of the sign to the power source therefor. Concurrently, the conductors in apparatus 177, in which sheet 171 is supported and moved are thus arranged to successively move the leading edge of the downwardly (as shown in FIG. 24) moving perforations in the uppermost layer or sheet of belt 171 of the signboard 55 away from the leading edge of perforations in belt 170.

The conductors (as 23) in the apparatus 177 in which sheet 171 is supported and moved are thus arranged to connect the leading edge of the downwardly (as shown in FIG. 24) moving perforations in the uppermost sheet or layer of belt 171 initially to operatively connect the uppermost lamps of lower half of the sign 37 to the power source 76 and, additionally and successively, horizontal row by horizontal row, connect the lamps of the lower rows of the lower half of the sign to the power source therefor. Thereby the sequence of light pattern shown in symbol 26 is created.

A pair of two similar apparatuses 184 and 185 similar to 174 and 175 respectively form unit 128. These are arrayed as units 174 and 175 as in FIG. 23.

Apparatus 184 is connected to the lamps of the left half of sign 37 as is unit 126. Apparatus 185 is connected to the lamps of the right half of sign 37 as is control unit 127.

Perforated sheets are belts 115 and 116 as shown in FIG. 23 each have an imperforate portion, as 117 and 117' and a perforated portion as 118 and 118' respectively. Each perforated portion is formed as is portion 110 of sheet 109. The conductors as 23 of U.S. Patent 1,394,- 565 in the apparatus 184 in which its belt or sheet is supported and moved are thus arranged to connect the leading edge of the upwardly (as shown in FIG. 23) moving perforations in its uppermost sheet or layer of belt initially to operatively connect the leftmost lamps of the left half of sign 37 to its power source 76, and additionally and successively, vertical row by vertical row, connect the lamps of the more central rows of the left half of the sign to the power source therefor. Concurrently, the conductors in apparatus 186, in which sheet 181 is supported and moved are arranged to successively move the leading edge of the downwardly (as shown in FIG. 23) moving perforations in the uppermost layer or sheet of belt 181 toward the leading edge of perforations in belt 180.

The conductors (as 23) in the apparatus 185 in which sheet 181 is supported and moved are thus arranged to connect the leading edge of the downwardly (as shown in FIG. 23) moving perforations in the uppermost sheet or layer of belt 181 initially to operatively connect the rightmost lamps of right half of the sign 37 to the power source 76 and, additionally and successively, vertical row by vertical row, connect the lamps of the more central rows of the right half of the sign to the power source therefor. Thereby the sequence of light pattern shown symbol 29 is created.

A pair of two similar apparatuses 176' and 177' similar to 121 and 120 respectively form unit 129 as in FIG. 24.

Apparatus 176' is conected to the lamps of the left half of sign 37 as is unit 121. Apparatus 177' is connected to the lamps of the right half of sign 37 as is control unit 120. Apparatuses 176' and 177' are relatively arranged as units 176 and 177, and except for the electrical connections therein are the same.

The conductors as 23 of U. S. Patent 1,394,565 in the apparatus 176' in which a belt or sheet as 170 in unit 128 is supported and moved are thus arranged to connect the leading edge of the upwardly (as shown in FIG. 24) moving perforations in the uppermost sheet or layer of belt in apparatus 176' initially to operatively connect the leftmost lamps of the right half of sign 37 to its power source 76, and additionally and successively, vertical row by vertical row, connect the lamps of the more lateral rows of the right half of the sign to the power source therefor. Concurrently, the conductors in apparatus 177', in which a sheet as 171 is supported and moved are thus arranged to successively move the leading edge of the downwardly (as shown in FIG. 24) moving perforations in the uppermost layer or sheet of that belt 55 away from the leading edge of perforations in the belt of apparatus 176'.

The conductors (as 23) in the aparatus 177' in which sheets as 171 is supported and moved are thus arranged to connect the leading edge of the downwardly (as shown in FIG. 24) moving perforations in the uppermost sheet or layer of belt such as 171 initially to operatively connect the rightmost lamps of left half of the sign 37 to the power source 76 and, additionally and successively, vertical row by vertical row, connect the lamps of the more lateral rows of the left half of the sign to the power source therefor. Thereby the sequence of light pattern shown in symbol 30 is created.

Figure 1:
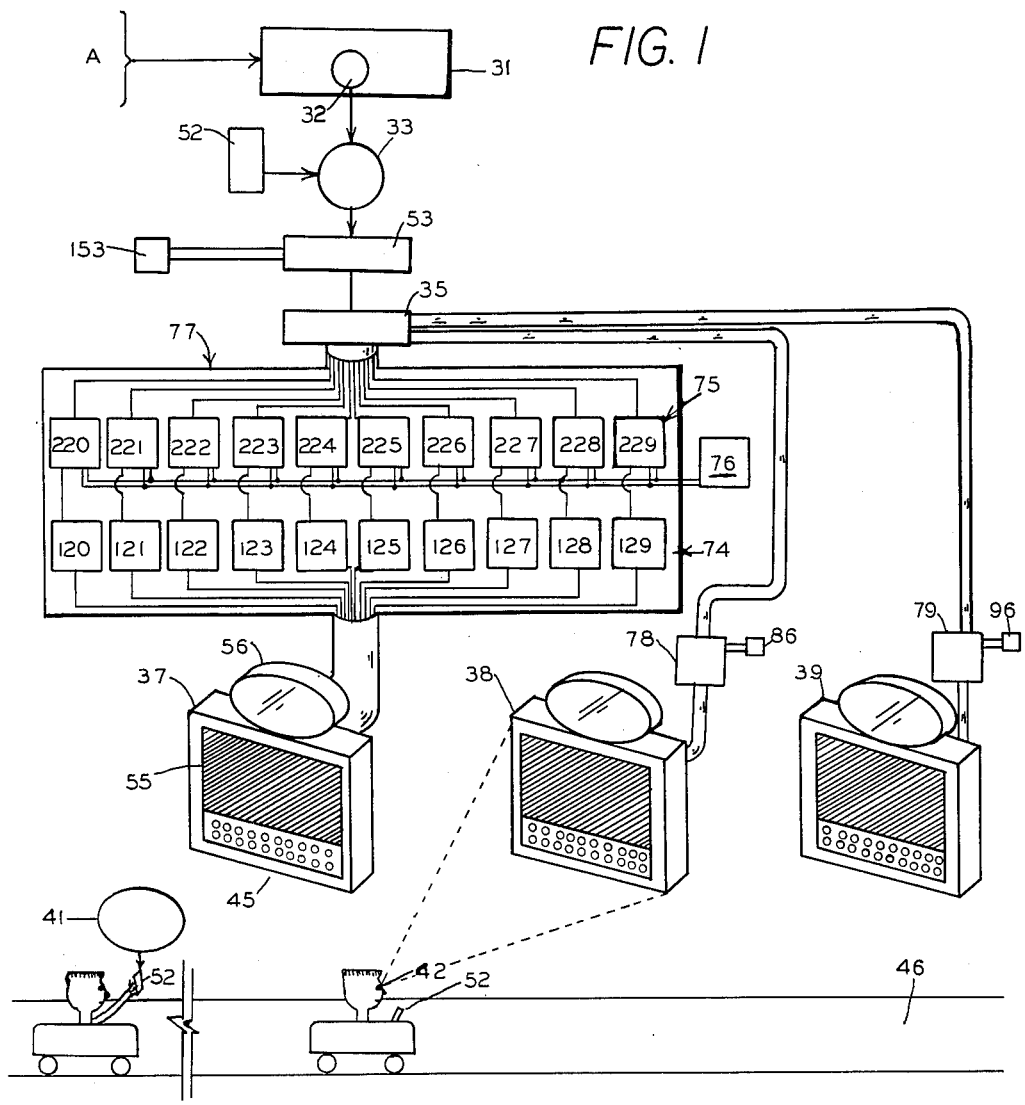
FIGURE 1 is a schematic diagram of the overall system of and apparatus for advertising and presentation of information on a plurality of signs; the sign of this invention forms a part thereof.

A card 52 is provided by the viewer 42 through the agents 41 of the advertiser as diagrammatically illustrated in FIGURE 1.

Dispatch box 53 is provided with card holder frames 130–139 for each of buttons 60–69 respectively and adjacent thereto. Each such frame as 130–139 is provided with a nearby representation, as 140–149 respectively, of symbols corresponding to the symbols as 20–30 on the card 52. Written information is located in each such card holder frame: this information states the meaning of the signal transmitted to the signs as 37, 38, 39 by the circuit actuated by the adjacent switch button; this information corresponds to the information on the card 52 as to the meaning of the pattern of light to be provided by the circuit of the adjacent button to the signs as 37–39.

As the information desired to be transmitted to the viewer by each signal represented by symbols 20–30 is changed on the code card 52 it is also correspondingly changed by operator 33 in the box frames 130–139.

The operator 33 in the preferred embodiment of process will transmit to the units as 77, 78, 79 a new coded signal such as shown by symbols 20–30 and card 52 and frames 130–139 every four hours; reference therefor is made to the standard clock 59 provided on the box 53; the information for such signal is received from operator 32 or station 31.

For providing to viewers as 42 information as to road conditions or directions as to how to get to different events or points on different dates correspondingly different information as to the significance of each signal on signs as 37, 38, 39 and represented by symbols as 20–30 on cards as 52 are provided to viewers as 42 through advertisers or their agents as 41. Such advertisers may have their trade names or trademarks as shown on advertising portion 65 of the signs 37–39 and also on the code cards. Such code may be on the back of cards carrying advertising or on credit cards.

The symbols 20–30 shown on code card 52 all refer to cyclically repeated sequences of moving patterns of light, portions of which patterns are shown in FIGURES 2–17. Each pattern uses on all the signs 37, 38, 39 a series of lamps arranged in equispaced rows or lines. The lamps in each line or row are simultaneously actuated. Each succeeding line or row of lamps on the signboard is successively actuated in a direction transverse to the length of such line or row. As the pattern shown by symbol, e.g. 20, 21, 22, 27, 28, 29, 30, is completed over a travel of about 10 feet (the size of the sign) in one or two seconds the sucessive movement characteristic of each pattern is repeated five times each second. The flasher of symbols 23 and 24 complete a cycle every ⅕ second.

Although in accordance with the provision of the patent statutes, particular preferred embodiments of apparatuses and procedure of this invention have been described in detail and the principles of the invention have been described in the best mode in which it is now contemplated applying such principles, it will be understood that the constructions shown and described are merely illustrative and that the invention is not limited thereto; accordingly, alterations and modifications which readily suggest themselves to persons skilled in the art without departing from the true spirit of the disclosure hereinabove are intended to be included in the scope of the annexed claims.

I claim:

1. A sign apparatus to produce any of several moving light patterns, said moving patterns each comprising a series of parallel lines of light-producing means supported on a face portion of said sign, means operatively connected to each of said light-producing means for simultaneously illuminating all parts of each line of said light-producing means of said series successively in either of two directions transverse to the length of said line from a first side of said face portion to an opposed side and another means for illuminating the rows successively from the opposed side to the said first side repeatedly and completing each said pattern on said sign within one-half to two seconds over a length and width of each ten feet thereof and control means for selecting one or the other of such means for operating said sign apparatus.

2. Apparatus as in claim 1 wherein said lines are spaced approximately six inches from each other whereby one additional of said lines is cumulatively lit in the successive movement characteristic of the pattern each one-fifth second during its cycle of operation.

3. A sign system comprising a plurality of like signs, a selector switch operatively connected to each of said signs for the concurrent like connection thereof to a power source therefor, said signs each comprising a series of like and intersecting rows of lamps extending across said sign vertically and horizontally and each of said lamps supported on a face portion of said sign and, operatively connected to each of said lamps, a first means for simultaneously illuminating all lamps in any of said rows successively and cumulatively transverse to the lengths of said rows from a first side of said face portion to an opposed side thereof and a second means for simultaneously illuminating all lamps in any of said rows successively and cumulatively transverse to the lengths of said rows from said opposed side of said face portion to said first side thereof and said first means and said second means each providing that each said pattern of illumination of the lamps of said rows is completed on each sign within one-half to two seconds over a length and width of each ten feet thereof and said lamps covering substantially the entire area of the face portion of each such sign and, operatively connected thereto, control means for selecting one or the other of such first and second means for illuminating said lamps of each said sign.

4. Apparatus as in claim 3 comprising also additional means for simultaneously illuminating all lamps in any of said rows successively and cumulatively in either of two directions transverse to the lengths of said rows from a first side of said face portion and, concurrently, from an opposed side thereof to the center of said sign face and another means for illuminating the rows successively and cumulatively from the center of said sign face to said first side and said opposed side concurrently, said additional means for illuminating providing the said pattern of illumination is completed on each sign within one-half to two seconds over a length and width of each ten feet thereof and said control means operatively connected thereto including further means for selecting one or the other of such additional means for illuminating said lamps of each sign.

References Cited by the Examiner
UNITED STATES PATENTS

| | | | |
|---|---|---|---|
| 1,103,294 | 7/1914 | Jones | 340—339 |
| 1,119,371 | 12/1914 | Reilly | 340—339 |
| 1,232,888 | 7/1917 | Brach | 340—334 X |
| 1,894,380 | 1/1933 | Long. | |
| 2,006,999 | 7/1935 | Nachumsohn | 340—337 X |
| 2,123,459 | 7/1938 | Anderson. | |
| 2,148,450 | 2/1939 | Eitzen | 340—339 |
| 2,422,149 | 6/1947 | Unkles | 340—339 X |
| 2,852,767 | 9/1958 | Foller | 340—334 X |
| 3,094,682 | 6/1963 | Brash | 340—22 |

References Cited by the Applicant
UNITED STATES PATENTS

| | | |
|---|---|---|
| 469,652 | 2/1892 | Jennings. |
| 622,910 | 4/1899 | Bell. |
| 1,119,371 | 12/1914 | Reilly. |
| 1,135,308 | 4/1915 | McNeal. |
| 1,152,092 | 8/1915 | Hopkins. |
| 1,234,514 | 7/1917 | Walden. |
| 1,271,600 | 7/1918 | Meyer. |
| 1,394,565 | 10/1921 | Long. |
| 1,441,902 | 1/1923 | Bailey. |
| 1,562,875 | 7/1923 | Stoddard. |

NEIL C. READ, *Primary Examiner.*

R. M. GOLDMAN, *Assistant Examiner.*